(12) United States Patent
Jia et al.

(10) Patent No.: US 11,776,157 B2
(45) Date of Patent: Oct. 3, 2023

(54) PANORAMIC IMAGE BASED JUMP POSITION DETERMINATION METHOD AND APPARATUS AND NON-TRANSITORY COMPUTER-READABLE MEDIUM

(71) Applicants: Haijing Jia, Beijing (CN); Hong Yi, Beijing (CN); Liyan Liu, Beijing (CN); Wei Wang, Beijing (CN)

(72) Inventors: Haijing Jia, Beijing (CN); Hong Yi, Beijing (CN); Liyan Liu, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 83 days.

(21) Appl. No.: 17/455,704

(22) Filed: Nov. 19, 2021

(65) Prior Publication Data

US 2022/0164984 A1 May 26, 2022

(51) Int. Cl.
| | | |
|---|---|---|
| *G06T 7/73* | (2017.01) | |
| *H04N 5/262* | (2006.01) | |
| *G06V 10/75* | (2022.01) | |
| *G06F 18/22* | (2023.01) | |
| *H04N 23/698* | (2023.01) | |

(52) U.S. Cl.
CPC ............... *G06T 7/74* (2017.01); *G06F 18/22* (2023.01); *G06V 10/751* (2022.01); *H04N 5/2628* (2013.01); *H04N 23/698* (2023.01); *G06T 2207/20084* (2013.01)

(58) Field of Classification Search
CPC ... G06T 7/74; G06T 2207/20084; G06T 7/33; G06T 19/003; G06T 7/73; G06T 7/97; G06T 2207/10016; G06F 18/22; G06V 10/751; G06V 10/74; G06V 20/00; H04N 5/2628; H04N 23/698; G06N 3/045
See application file for complete search history.

(56) References Cited

U.S. PATENT DOCUMENTS

2012/0307000 A1* 12/2012 Doepke ..................... G06T 7/35
348/E5.031

* cited by examiner

*Primary Examiner* — Farzana Hossain
(74) *Attorney, Agent, or Firm* — IPUSA, PLLC (57) ABSTRACT

Disclosed are a panoramic image based jump position determination method and apparatus. The method includes steps of obtaining first and second original panoramic images having the same horizontal width; performing, based on posture data of cameras respectively shooting the two original panoramic images, an adjustment process on at least one of the two original panoramic images, so as to acquire first and second panoramic images; after the adjustment process, conducting a feature extraction process regarding the two panoramic images, and choosing, based on a result of the feature extraction process, a plurality of pairs of image columns on the two panoramic images, so as to select at least one pair of first image columns from among the plurality of pairs of image columns; and determining, based on the at least one pair of first image columns, jump positions on the first and second panoramic images for jumping between the two.

19 Claims, 10 Drawing Sheets

PANORAMIC IMAGE BASED JUMP POSITION DETERMINATION METHOD AND APPARATUS AND NON-TRANSITORY COMPUTER-READABLE MEDIUM

BACKGROUND OF THE DISCLOSURE

1. Field of the Disclosure

The present disclosure relates to the field of image processing, and particularly, at least a panoramic image based jump position determination method and apparatus as well as a non-transitory computer-readable medium.

2. Description of the Related Art

Virtual roaming is an important branch of virtual reality (VR) technology, and related to various industries like real estate, urban planning, tourism, games, aerospace, medicine, etc. By the combination of virtual scene creation technology and virtual roaming technology, a user can autonomously roam in three-dimensional (3D) scenes such as buildings, cities, games, and the like, so that the user is able to have an intuitive experience of these kinds of roaming scenes.

In general, a virtual roaming creator may use production tools such as 720 Yun (a cloud based service provided by Huawei Technologies Co., Ltd.) and so on to process pre-photographed panoramic images. By selecting jump positions (also called jump locations) on two scene-associated panoramic images and setting mutually-linked navigation points on the jump locations, it is possible to build the jump relationship between the two scene-associated panoramic images, so as to complete virtual roaming production. In an actual virtual roaming process, a user may select and click a navigation point displayed in a current roaming scene, so as to leave the current scene from a jump location on the current panoramic image, and automatically jump to another jump location on a next panoramic image, linked to the navigation point, thereby continuing to roam the next scene.

However, such a method of manually selecting corresponding jump locations and setting navigation points on two panoramic images is seriously inefficient. If an inappropriate jump location is selected for setting a navigation point, then the viewing angle of a user observing the relevant 3D scene will change greatly before and after jump. This may influence the user's actual roaming experience. As such, there is a need for a method and apparatus that can automatically and accurately determine jump locations on two panoramic images, so as to reasonably set navigation points.

SUMMARY OF THE DISCLOSURE

The present disclosure aims to provide at least a panoramic image based jump position determination method and apparatuses for solving the above-described technical problem.

According to a first aspect of the present disclosure, a panoramic image based jump position determination method is provided that may include steps of obtaining a first original panoramic image and a second original panoramic image having the same horizontal width, wherein, a shooting point for shooting the first original panoramic image is located in a 3D space corresponding to the second original panoramic image, and a shooting point for shooting the original second panoramic image is located in a 3D space corresponding to the first original panoramic image; performing, based on posture data of cameras respectively shooting the first original panoramic image and the second original panoramic image, an adjustment process on at least one of the first original panoramic image and the second original panoramic image, so as to acquire a first panoramic image and a second panoramic image corresponding to the same camera posture; after the adjustment process, conducting a feature extraction process with respect to the first panoramic image and the second panoramic image, and choosing, based on a result of the feature extraction process, a plurality of pairs of image columns respectively having the same horizontal positions on the first panoramic image and the second panoramic image, so as to select one or more pairs of first image columns from among the plurality of pairs of image columns, wherein, feature similarities of the one or more pairs of first image columns meet a predetermined requirement; and determining, based on the one or more pairs of first image columns, jump locations on the first panoramic image and the second panoramic image for jumping between the first panoramic image and the second panoramic image.

According to a second aspect of the present disclosure, a panoramic image based jump position determination apparatus is provided that may contain an obtainment part configured to obtain a first original panoramic image and a second original panoramic image having the same horizontal width, wherein, a shooting point for shooting the first original panoramic image is located in a 3D space corresponding to the second original panoramic image, and a shooting point for shooting the second original panoramic image is located in a 3D space corresponding to the first original panoramic image; an adjustment part configured to perform, based on posture data of cameras respectively shooting the first original panoramic image and the second original panoramic image, an adjustment process on at least one of the first original panoramic image and the second original panoramic image, so as to acquire a first panoramic image and a second panoramic image corresponding to the same camera posture; a feature extraction and selection part configured to, after the adjustment process, conduct a feature extraction process with respect to the first panoramic image and the second panoramic image, and choose, based on a result of the feature extraction process, a plurality of pairs of image columns respectively having the same horizontal positions on the first panoramic image and the second panoramic image, so as to select one or more pairs of first image columns from among the plurality of pairs of image columns, wherein, feature similarities of the one or more pairs of first image columns meet a predetermined requirement; and a position determination part configured to determine, based on the one or more pairs of first image columns, jump locations on the first panoramic image and the second panoramic image for jumping between the first panoramic image and the second panoramic image.

According to a third aspect of the present disclosure, another panoramic image based jump position determination apparatus is provided that may involve a processor and a storage connected to the processor. The storage may store computer-executable instructions that, when executed by the processor, can make the processor to implement the above-mentioned panoramic image based jump position determination method.

According to a fourth aspect of the present disclosure, a computer-executable program and a non-transitory computer-readable medium are provided. The computer-executable program may cause a computer to conduct the above-described panoramic image based jump position determination method. The non-transitory computer-readable medium can store computer-executable instructions (i.e., the computer-executable program) for execution by a computer having a processor. The computer-executable instructions, when executed by the processor, may render the processor to perform the above-mentioned panoramic image based jump position determination method.

On the basis of at least the panoramic image based jump position determination method and apparatuses, it is possible to find one or more pairs of image columns, whose feature similarities satisfy a predetermined requirement, on two panoramic images, so as to determine jump locations on the two panoramic images for jumping between the two panoramic images, and set the corresponding navigation points in accordance with the found one or more pairs of image columns. In this way, it is possible to automatically and accurately determine jump locations on two panoramic images to reasonably set navigation points, improve the efficiency of setting the navigation points, and keep the viewing angle of a user unchanged before and after jump, so that the user seems jump to a next scene by moving forward, and can have a better progressive roaming experience.

DETAILED DESCRIPTION OF THE PREFERRED EMBODIMENTS

In order to let a person skilled in the art better understand the present disclosure, hereinafter, the embodiments of the present disclosure are concretely described with reference to the drawings. However, it should be noted that the same symbols, that are in the specification and the drawings, stand for constructional elements having basically the same function and structure, and the repetition of the explanations to the constructional elements is omitted.

Figure 1:
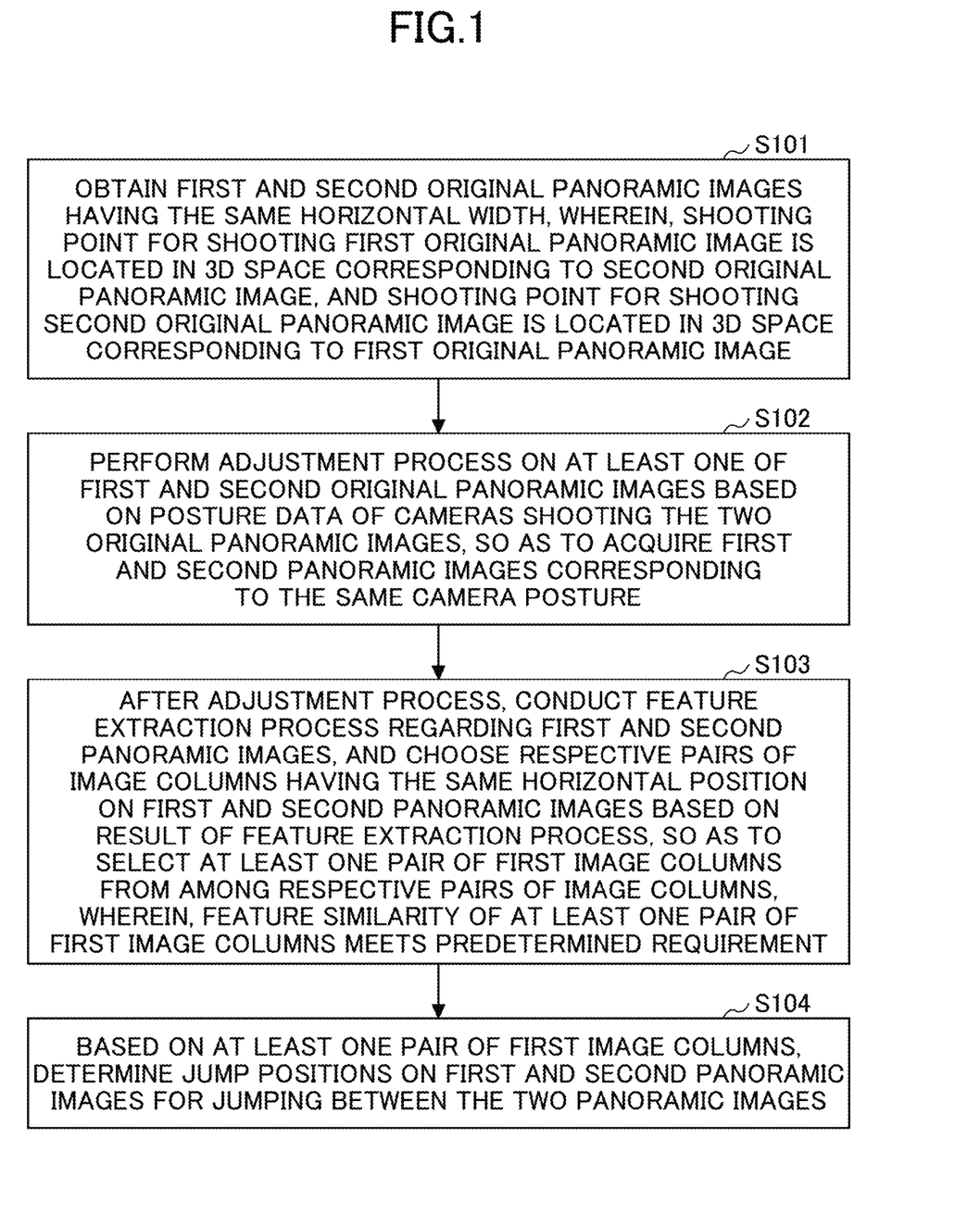
FIG. 1 is a flowchart of a panoramic image based jump position determination method according to an embodiment of the present disclosure.

In what follows, a panoramic image based jump position determination method according to an embodiment of the present disclosure is described by referring to FIG. 1.

FIG. 1 is a flowchart of the panoramic image based jump position determination method. As shown in FIG. 1, the panoramic image based jump position determination method is inclusive of STEPS S101 to S104.

In STEP S101, it is possible to obtain a first original panoramic image and a second original panoramic image having the same horizontal width. Here the shooting point for shooting the first original panoramic image is located in the 3D space corresponding to the second original panoramic image, and the shooting point for shooting the second original panoramic image is located in the 3D space corresponding to the first original panoramic image.

In this step, the 3D space corresponding to each original panoramic image is a 3D space where all the objects exhibited by the same panoramic image are located.

In an example, it is possible to perform shooting at two shooting points in the same subspace (e.g., the same room in a house) so as to obtain the first and second panoramic images, respectively. In this case, each of the two original panoramic images captured corresponds at least the same subspace (i.e., each of the two original panoramic images exhibits all the objects in at least the same subspace), and both of the two shooting points are located in the same subspace.

Furthermore, in other example, it is also possible to conduct photographing at two shooting points in two adjacent subspaces (e.g., two adjacent rooms in a house) to obtain the first and second panoramic images, respectively. As long as a condition is satisfied that the straight line segment between the two shooting points is not blocked or obscured by intermedia structures such as doors, walls, and the like, so that the corresponding two cameras (panoramic cameras) at the two shooting points are visible to each other, it is okay. In this way, the first and second original panoramic images used in the embodiment of the present disclosure can be obtained.

Figure 2:
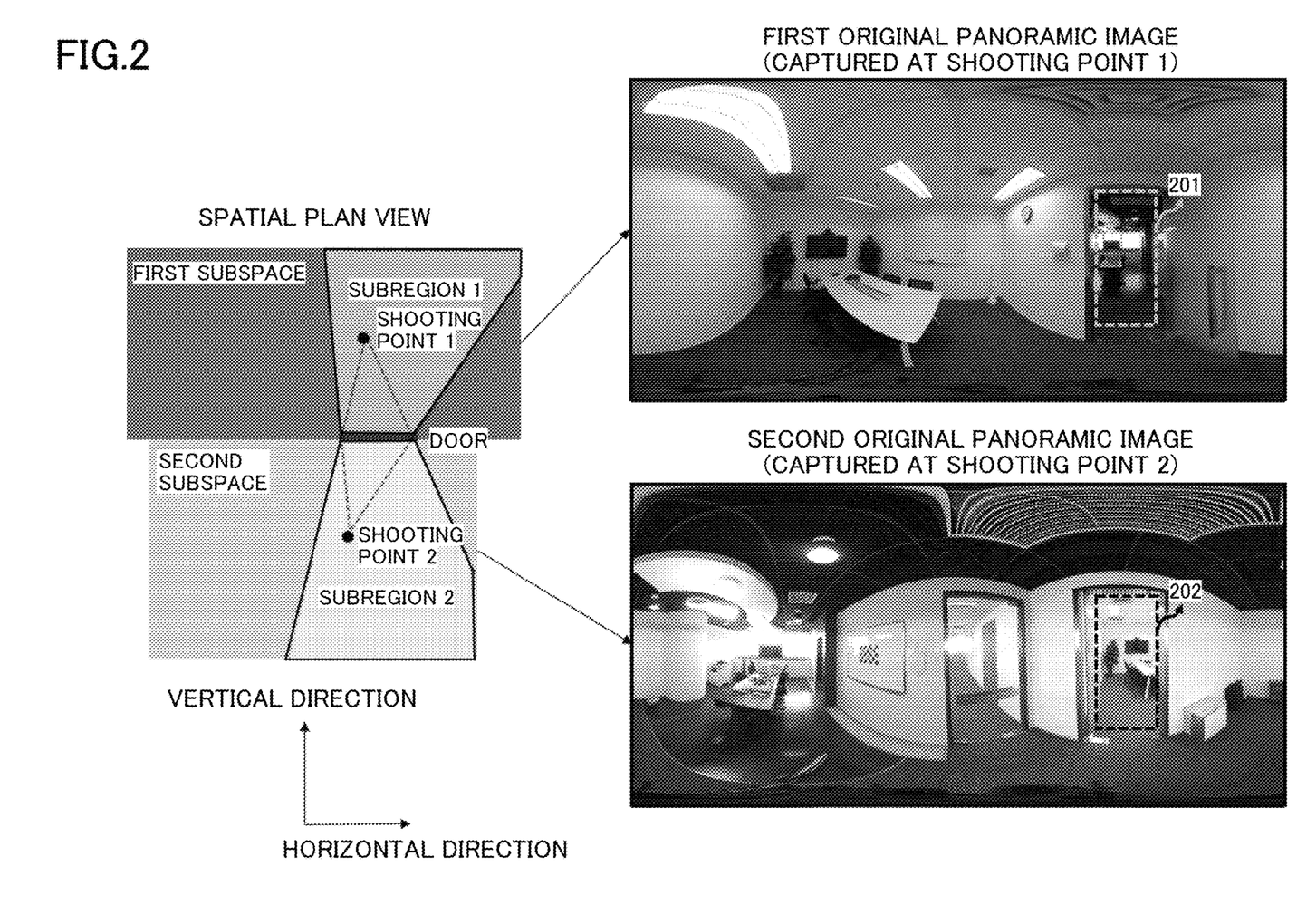
FIG. 2 illustrates examples of a spatial plane of two adjacent subspaces as well as first and second original panoramic images having the same horizontal width, obtained by shooting at two shooting points that are visible to each other in the two adjacent subspace.

FIG. 2 illustrates examples of a spatial plane of two adjacent subspaces (i.e., a first subspace and a second subspace) as well as a first original panoramic image and a second original panoramic image having the same horizontal width, obtained by shooting at two shooting points that are visible to each other in the two adjacent subspace.

As presented in FIG. 2, the first original panoramic image is on the top right, which is obtained by shooting at the shooting point 1 in the first subspace, and the second original panoramic image is on the bottom right, which is obtained by photographing at the shooting point 2 in the second subspace. Because the cameras (not shown in the drawings) at the two shooting points for shooting the two original panoramic images are visible to each other, the first original panoramic image includes not only an image portion corresponding to the first subspace but also an image portion (i.e., the image portion 201) corresponding to the subregion 2, in which the shooting point 2 is located, in the second subspace, and the second original panoramic image contains not only an image portion corresponding to the second subspace but also an image portion (i.e., the image portion 202) corresponding to the subregion 1, in which the shooting point 1 is located, in the first subspace.

Moreover, both the image portion 201 in the first original panoramic image and the left half of the second original panoramic image correspond to the second subspace, and exhibit objects like a dark-colored conference table, a television set, and so on placed in the second subspace, so the feature similarity between the image portion 201 in the first panoramic image and the left half of the second panoramic image is relatively high. Similarly, both the image portion 202 in the second original panoramic image and the left half of the first original panoramic image correspond to the first subspace, and exhibit objects such as a light-colored conference table, a television set, plants next to the television set, and so forth arranged in the first subspace, so the feature similarity between the image portion 202 in the second original panoramic image and the left half of the first panoramic image is also relatively high.

Hereinafter, a specific process is minutely described that is selecting at least one pair of image columns, whose feature similarity meets a predetermined requirement, on a first panoramic image and a second panoramic image, so as to determine, based on the selected at least one pairs of image columns, jump locations on the two panoramic images for jumping between them.

Referring again to FIG. 1; in STEP S102, an adjustment process is performed on at least one of the first original panoramic image and the second original panoramic image on the basis of the posture data of the cameras shooting the two panoramic images, so as to acquire a first panoramic image and a second panoramic image having the same horizontal width, corresponding to the same camera posture.

Figure 3:
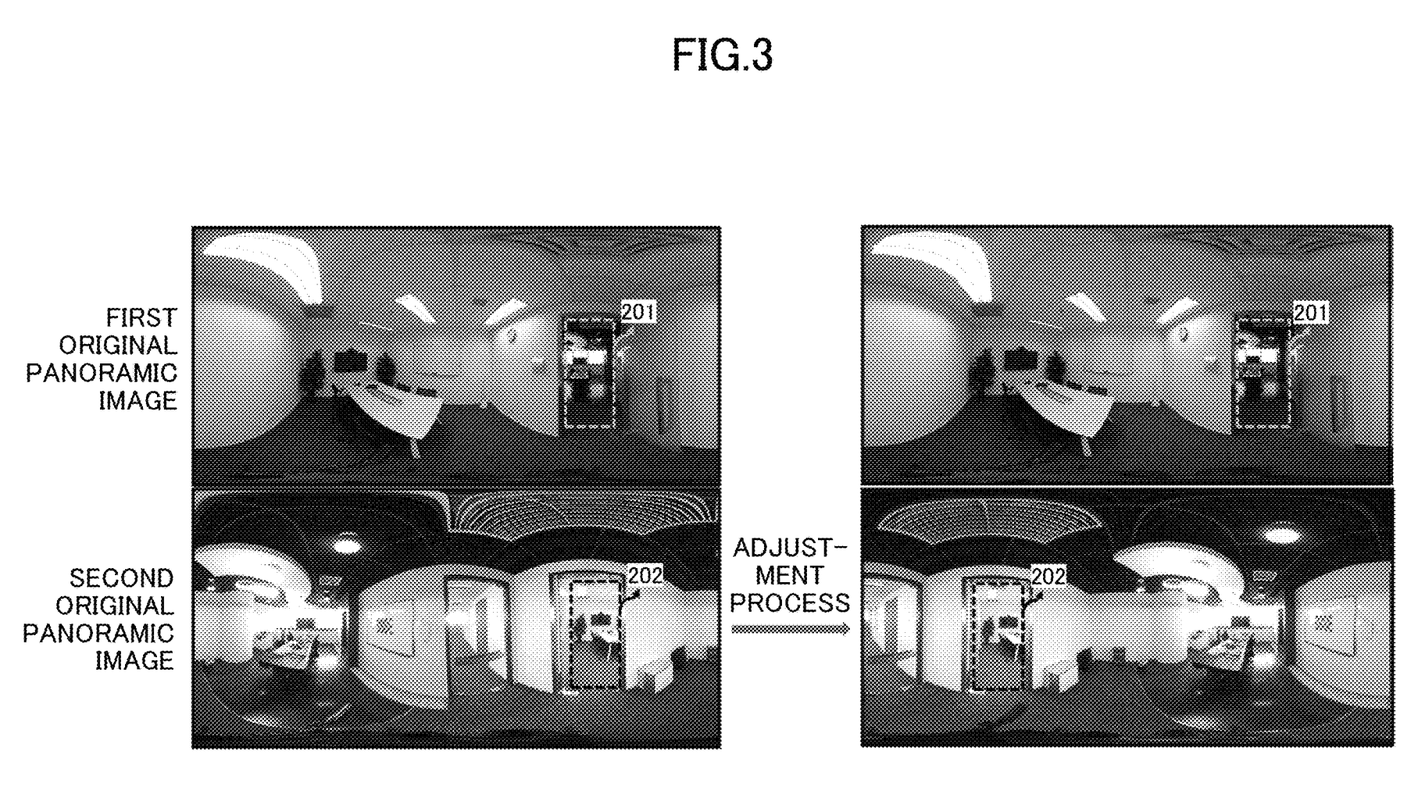
FIG. 3 shows an example of conducting an adjustment process in regard to at least one of the first and second original panoramic images to attain first and second panoramic images having the same horizontal width.

FIG. 3 shows an example of conducting an adjustment process in regard to the second original panoramic images to acquire a first panoramic image and a second panoramic image having the same horizontal width.

As shown in FIG. 3, the adjustment process is performed on the second original panoramic image. By the adjustment process, the right half of the second original panoramic image including the image portion 202, that has a relatively high similarity with the left half of the first original panoramic image, is adjusted so as to be the left half of the second panoramic original image, and the left half of the second panoramic image, that has a relatively high similarity to the image portion 201 in right half of the first panoramic image, is adjusted so as to serve as the right half of the second panoramic image. In this way, it is possible to acquire the first and second panoramic images, as illustrated in this drawing, and align, in the horizontal direction, at least one pair of image columns (here it should be noted that the width of an image column may be one pixels, two pixels, several pixels, etc., and the height of the image column may be the height of any one of the first and second panoramic images, etc.) to be found on the first and second panoramic images, whose feature similarity meets the predetermined requirement, so as to facilitate the subsequent direct calculation of the feature similarities of a plurality of pairs of image columns having the same horizontal position and the related selection process, thereby being able to reduce the amount of calculation required for the relevant process, and improve the accuracy of image column selection.

Here the posture of each camera in this step is the orientation of the same camera when it photographs the corresponding original panoramic image in the corresponding 3D space. In this step, a posture sensor of the same camera can be used to collect the posture data of the same camera when the corresponding original panoramic image is taken; for example, it is possible to utilize a gyroscope of the same camera to collect angular velocity meter parameters, etc. In addition, other means may also be adopted to attain the posture data of the same camera when the corresponding original panoramic image is captured. However, the present disclosure is not limited to this.

After attaining the posture data of the cameras, it is possible to project at least one of the first and second panoramic images by spherical projective transformation (also called stereographic projection) to acquire a 3D spherical image, utilize the difference between the posture data of the two cameras when they capture the two original panoramic images to calculate an angle that the 3D spherical image needs to be rotated, and rotate the 3D spherical image by the angle.

Subsequently, the rotated 3D spherical image can be projected by using inverse stereographic projection to obtain a planar panoramic image serving as a panoramic image after the adjustment process. Here it should be noted that a person skilled in the art may use any other approach besides the above projection and rotation operation to adjust at least one of the first and second panoramic images, so as to let them correspond to the same camera posture. However, the present disclosure is not limited to this.

Additionally, the cameras may not be completely horizontally placed in the shooting process, so each of the two original panoramic images obtained by shooting may have a certain degree of skew. In this case, before or after the adjustment process is performed on the first and second original panoramic images, the posture data of the cameras collected by the posture sensors can be utilized to conduct a vertical correction process with respect to the corresponding two panoramic images, respectively, so as to improve the accuracy of the subsequent processing.

Moreover, in another example, it is also possible to detect straight lines on each of the first and second original panoramic images captured by shooting, and calculate six vanishing points by using Hough transform, so as to obtain three vanishing directions serving as camera posture data, and then, use the camera posture data to carry out a vertical correction process in regard to the corresponding panoramic image.

In step S103, after the adjustment process, a feature extraction process is performed on the first and second panoramic images, and a plurality of pairs of image columns having the same horizontal position on the first and second panoramic images is chosen on the basis of the result of the feature extraction process, so as to select at least one pair of first image columns from among the plurality of pairs of images, whose feature similarity meets the predetermined requirement.

The following introduces in detail two selection schemes adopted in the embodiment of the present disclosure for selecting the at least one pair of first image columns on the first and second panoramic images, whose feature similarity meets the predetermined requirement. However, it is worth mentioning that the present disclosure is not limited to this. Actually, other means may also be employed to choose a plurality of pairs of image columns on the first and second panoramic images, so as to select at least one pair of image columns, whose feature similarity is highest, from among the plurality of pairs of image columns to be the at least one pair of first image columns used in the embodiment of the present disclosure.

Image Selection Scheme 1

Generally speaking, this scheme is performing feature point matching on the first and second panoramic images, and choosing on each matched pair of feature points, so as to realize the selection of each pair of image columns on the two panoramic images.

In this scheme, conducting the feature extraction process with respect to the first and second panoramic images may include performing feature point matching on the first and second panoramic images to extract each matched pair of feature points on the two panoramic images.

Figure 4:
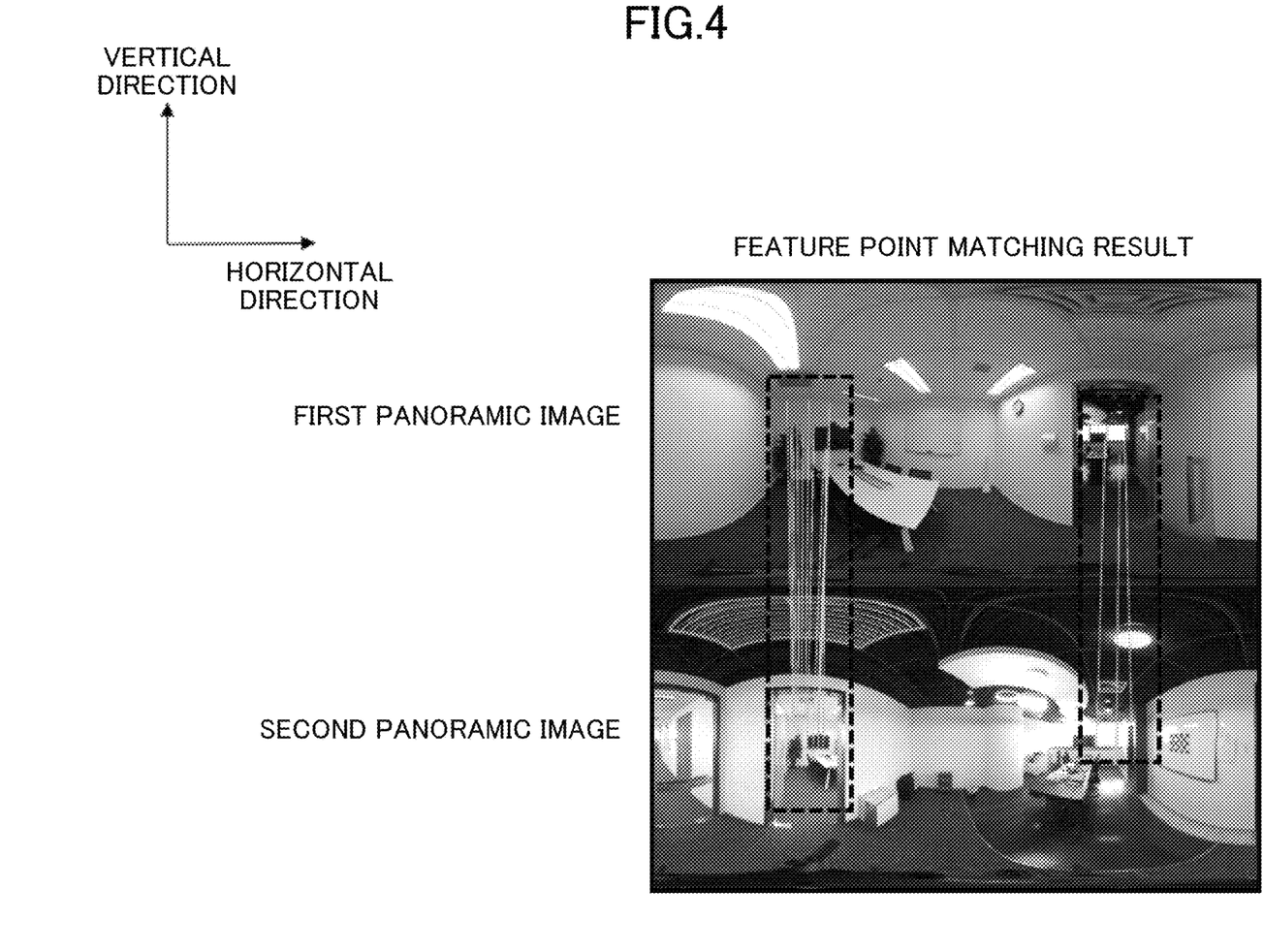
FIG. 4 presents an example of a feature point matching result acquired by performing feature point matching on the first and second panoramic images.

FIG. 4 presents an example of a feature point matching result acquired by performing feature point matching on the first and second panoramic images.

In FIG. 4, all the matched pairs of feature points on the first and second panoramic images are surrounded by the black dashed frames. In the feature point matching process, feature point matching can be performed on the complete first and second panoramic images, so as to directly extract each matched pair of feature points on the two panoramic images.

Additionally, in order to further improve the accuracy of feature point matching, it is also possible to horizontally divide the first and second panoramic images into a plurality of image blocks with the same horizontal width, conduct a feature point matching process in regard to each pair of image blocks having the same horizontal width on the two panoramic images, and let the feature point matching result of each pair of image blocks reappear on the two complete panoramic image, thereby extracting each matched pair of feature points on the first and second panoramic images.

Here it should be mentioned that many conventional approaches such as Oriented FAST and Rotated BRIEF (ORB), Speeded Up Robust Features (SURF), Scale Invariant Feature Transform (SIFT) and so forth, which are well known to a person skilled in the art, may be adopted to achieve the feature point matching process, and the present disclosure is not limited to this.

After the feature point matching process, the respective matched pairs of feature points may be used as the result of the feature extraction process. Furthermore, choosing, based on the result of the feature extraction process, a plurality of pairs of image columns respectively having the same horizontal positions on the first and second panoramic images, so as to select at least one pair of first image columns, whose feature similarity satisfies the predetermined requirement, from among the plurality of pairs of image columns may be inclusive of calculating the position difference between the horizontal positions of each matched pair of feature points, and choosing at least one pair of first feature points, whose position difference is less than a predetermined first threshold, from among the respective matched pairs of feature points, so as to select at least one pair of first image columns corresponding to the horizontal position of the at least one pair of first feature points, from among the plurality of pairs of image columns.

Specifically, the difference between the horizontal positions (i.e., the horizontal coordinates in pixels) of each matched pair of feature points on the first and second panoramic images may be first calculated to serve as the position difference of the same matched pair of feature points. Next, it is possible to compare the calculated position differences of the respective matched pairs of feature points and the predetermined first threshold, and choose at least one pair of first feature points from among the respective matched pairs of feature points, whose position difference is less than the predetermined first threshold.

Figure 5:
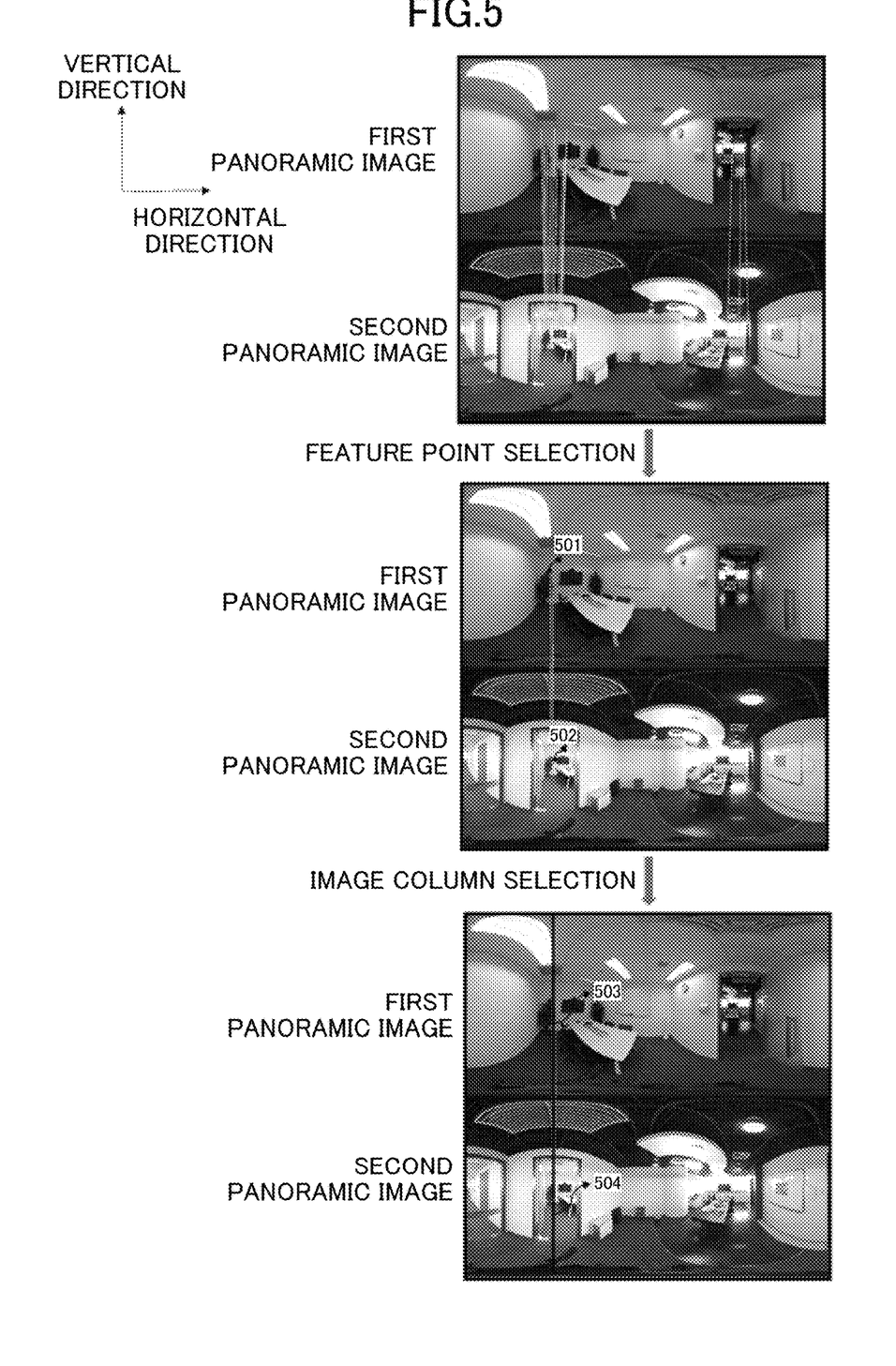
FIG. 5 shows an example of performing choosing on a plurality of matched pairs of feature points to achieve selection conducted regarding a plurality of pairs of image columns on the first and second panoramic images.

FIG. 5 shows an example of performing choosing on the respective matched pairs of feature points to achieve selection conducted regarding the plurality of pairs of image columns on the first and second panoramic images.

As illustrated in FIG. 5, at least a pair of first feature points 501 and 502 is chosen whose position difference meets the predetermined first threshold, and it can be seen that the horizontal positions of this pair of first feature points 501 and 502 are very close to each other.

In order to further select, based on the chosen at least one pair of first feature points, at least one pair of first image columns corresponding to the horizontal position of the at least one pair of first feature points, in an example, it is possible to determine, according to the average horizontal position of the chosen at least one pair of first feature points, the horizontal position of the corresponding at least one pair of first image columns.

For example, as presented in FIG. 5, it is possible to calculate the average value of the horizontal positions (i.e., the horizontal coordinates) of the first feature points 510 and 502 (i.e., the chosen at least one pair of first feature points) to attain their average horizontal position, and select a pair of image columns 503 and 504, whose horizontal position is the same as the average horizontal position, on the first and second panoramic images to serve as a pair of first image columns corresponding to the horizontal position of the pair of first feature points 501 and 502.

In other example, it also possible to select, based on the horizontal position of any one first feature point of the chosen at least one pair of first feature points, the corresponding at least one pair of first image columns. For example, as shown in FIG. 5, a pair of image columns whose horizontal position is the same as the horizontal position of the first feature point 501 or 520 can be selected from the first and second panoramic images to be a pair of first image columns corresponding to the horizontal position of the pair of first feature points 501 and 502. However, the present disclosure is not limited to this.

It should be pointed out that there exists a case where it is impossible to choose a pair of first feature points on the basis of the predetermined first threshold because the predetermined first threshold is too large, thereby resulting that it is impossible to select a pair of first image columns. As such, if the position difference of each matched pair of feature points is greater than the predetermined first threshold, then it is possible to decrease the predetermined first threshold until at least one pair of first feature points can be chosen from among the respective matched pairs of feature points.

The at least one pair of first image columns acquired by the above-described feature point matching and choosing scheme is a pair of first image columns whose feature similarity satisfies the predetermined requirement.

Image Selection Scheme 2

In general, this scheme is obtaining, by inputting the first and second panoramic images into a convolutional neural network (CNN), feature maps corresponding the two panoramic images, and performing choosing on each pair of image column features on the feature maps, so as to realize the selection of each pair of image columns on the two panoramic images.

In this scheme, the feature extraction process conducted with respect to the first and second panoramic images may include inputting the two panoramic images into the CNN to acquire at least one first feature map of the first panoramic image and at least one second feature map of the second panoramic image. Here the horizontal width of the least one first feature map is the same as the horizontal width of the first panoramic image, and the horizontal width of the least one second feature map is the same as the horizontal width of the second panoramic image.

As is well known to a person skilled in the art, by inputting an image into the CNN, at least one feature map of the image can be extracted through a convolutional layer of the CNN. The at least one feature map includes a plurality of feature values arranged according to the positions of the features on the image. Furthermore, the size of the at least one feature map can be controlled by a zero-padding operation. Accordingly, by carrying out size control in this way, it is possible to attain the at least one first feature map and the at least one second feature map of the first and second panoramic images, respectively.

Figure 6:
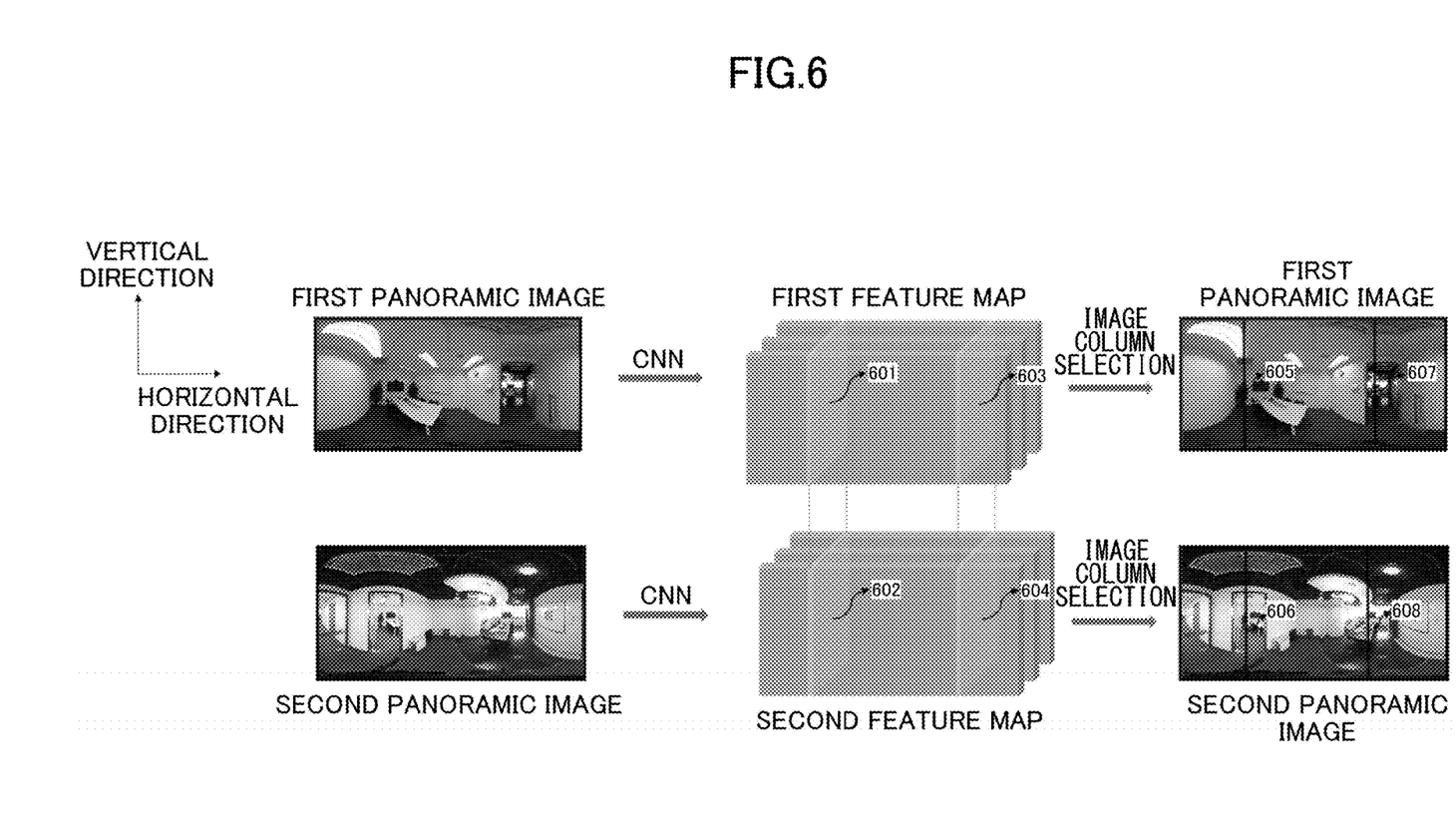
FIG. 6 illustrates an example of carrying out choosing with respect to a plurality of pairs of image column features to fulfil selection performed on a plurality of pairs of image columns on the first and second panoramic images.

FIG. 6 illustrates an example of carrying out choosing with respect to the respective pairs of image column features to fulfil selection performed on the plurality of pairs of image columns on the first and second panoramic images.

As presented in FIG. 6, although three first feature maps and three second feature maps are respectively extracted pertaining to the first and second panoramic images, the present disclosure does not limit the number of the first and second feature maps (i.e., the depth of first and second feature maps) and the height of the first and second feature maps along the vertical direction.

After the first feature maps and the second feature maps are acquired, it is possible to make the first and second feature maps to be the result of the feature extraction process, and choose, based on the result of the feature extraction process, each pair of image columns having the same horizontal position on the first and second panoramic images, so as to select at least one pair of first image columns, whose feature similarity meets the predetermined requirement, from among the respective pairs of image columns. This may involve calculating the feature difference between each pair of image column features having the same horizontal position on the first and second feature maps, and choosing at least one pair of first image column features, whose feature difference is less than a predetermined second threshold, from among the respective pairs of image column features, so as to select at least one pair of first image columns corresponding to the horizontal position of the at least one pair of first image column features, from among the respective pairs of image columns.

Specifically, it is possible to extract, column by column (e.g., from left to right or right to left in the horizontal direction), the image column feature at each horizontal position on the first and second feature maps. Here each image column feature extracted is a feature matrix containing one or more feature vectors. After extracting each image column feature, the feature difference between each pair of image column features having the same horizontal position on the first and second feature maps can be calculated.

In an example, in order to calculate the feature difference between each pair of image column features, for the same pair of image column features, it is possible to calculate the distance (such as L2 distance, cosine similarity, etc.) between the feature vectors having the same vertical position from top to bottom or bottom to top along the vertical direction, and sum up the calculated distances to serve as the feature difference of the same pair of image column features. However, the present disclosure is not limited to this; that is, a person skilled in the art may also adopt other approaches for calculating the difference between two feature matrixes to determine the feature difference between each pair of image column features used in the embodiment of the present disclosure.

After the feature difference between each pair of image column features with the same horizontal position on the first and second feature maps is attained, it is possible to compare the feature difference of the same pair of image column features and the predetermined second threshold, so as to choose at least one pair of first image column feature whose feature difference is less than the predetermined second threshold. Next, at least one pair of image columns, that has the same horizontal position as the at least one pair of first image column features, on the first and second panoramic images can be selected as at least one pair of first image columns whose feature similarity meets the predetermined requirement.

As presented in FIG. 6, by performing feature difference calculation and threshold based comparison on each pair of image column features on the first and second feature maps, a pair of first image column features 601 and 602 as well as another pair of first image column features 603 and 604 whose feature differences are less than the predetermined second threshold are chosen. Then a pair of first image columns 605 and 606 having the same horizontal position as the pair of first image column features 601 and 602 as well as another pair of first image columns 607 and 608 with the same horizontal position as the other pair of first image column features 603 and 604 are selected. Here these two pairs of first image columns are two pairs of first image columns, whose feature similarities satisfy the predetermined requirement, selected from the first and second panoramic images.

It should be noted that there exists a case where it is impossible to choose a pair of first image column features on the basis of the predetermined second threshold because the predetermined second threshold is too large, thereby resulting that it is impossible to select a pair of first image columns. Consequently, if the feature difference of each pair of image column features is greater than the predetermined second threshold, then it is possible to decrease the predetermined second threshold until at least one pair of first image column features can be chosen from among the respective pairs of image column features.

By means of the above-described two image column selection schemes, at least one pair of first image columns, whose feature similarity meets the predetermined requirement, can be selected from the first and second panoramic images.

Referring again to FIG. 1; STEP S104 is determining, based on the at least one pair of first image columns, jump positions on the first and second panoramic images for jumping between the two.

Generally, it is necessary to determine two jump positions on a panoramic image, namely, a departure position for jumping from this panoramic image to another panoramic image and an arrival position for jumping from the other panoramic image to this panoramic image.

In a case where two pairs of first image columns are selected whose feature similarities satisfy the predetermined requirement, and they are located in the left and right half parts of the first and second panoramic images, respectively, it is possible to determine, directly based on the positions of the two pairs of first image columns, a departure position on the first panoramic image and an arrival position on the second panoramic image for jumping from the first panoramic image to the second panoramic image as well as a departure position on the second panoramic image and an arrival position on the first panoramic image for jumping from the second panoramic image to the first panoramic image, thereby accomplishing panoramic image based jump position selection.

If only one pair of first image columns is selected whose feature similarity meets the predetermined requirement, then it is possible to use the same horizontal width of the first and second panoramic images to directly determine the position of another pair of first image columns. Specifically, the other pair of first image columns may be determined at a horizontal position, the distance between which and the horizontal position of the selected pair of first image columns is a half of the same horizontal width of the first and second panoramic images.

Figure 7:
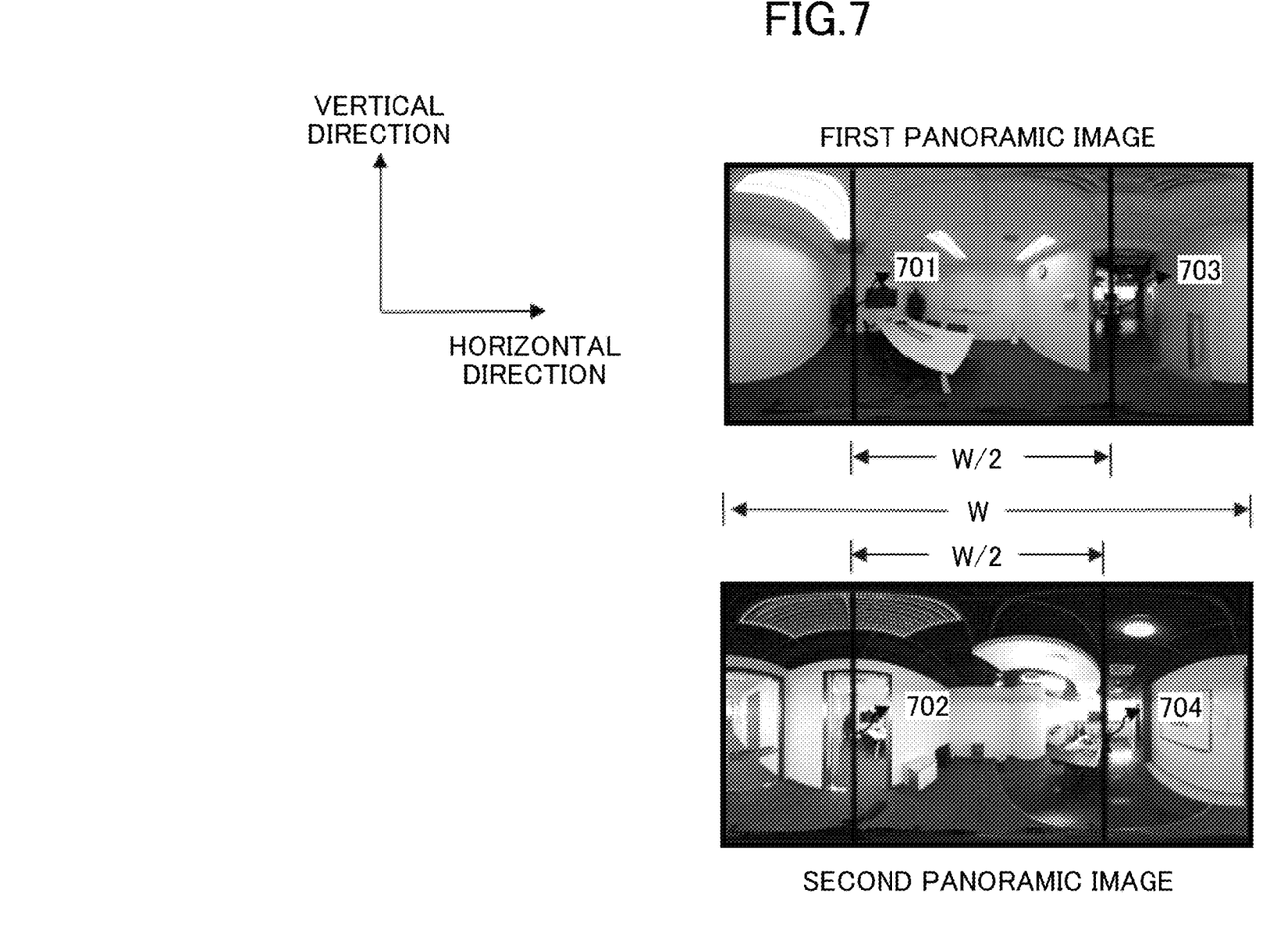
FIG. 7 presents an example of determining, in a case where only one pair of first image columns is selected, another pair of first image columns on the basis of the same horizontal width of the first and second panoramic images.

FIG. 7 shows an example of determining another pair of first image columns on the basis of the same horizontal width of the first and second panoramic images in a case where only one pair of first image columns is selected.

As presented in FIG. 7, only one pair of first image columns 701 and 702 is selected on the first and second panoramic images. In this case, it is possible to directly determine another pair of image columns 703 and 704 on the first and second panoramic images to serve as the other pair of first image columns. Here the distance between the pair of image columns 703 and 704 and the selected pair of first image columns 701 and 702 is a half of the same horizontal width of the first and second panoramic images (i.e., W/2 shown in this drawing).

Additionally, in a case where three or more pairs of first image columns are selected whose feature similarities meet the predetermined requirement, it is possible to perform an aggregation process on the three or more pairs of first image columns so as to acquire two pairs of first image columns.

Figure 8:
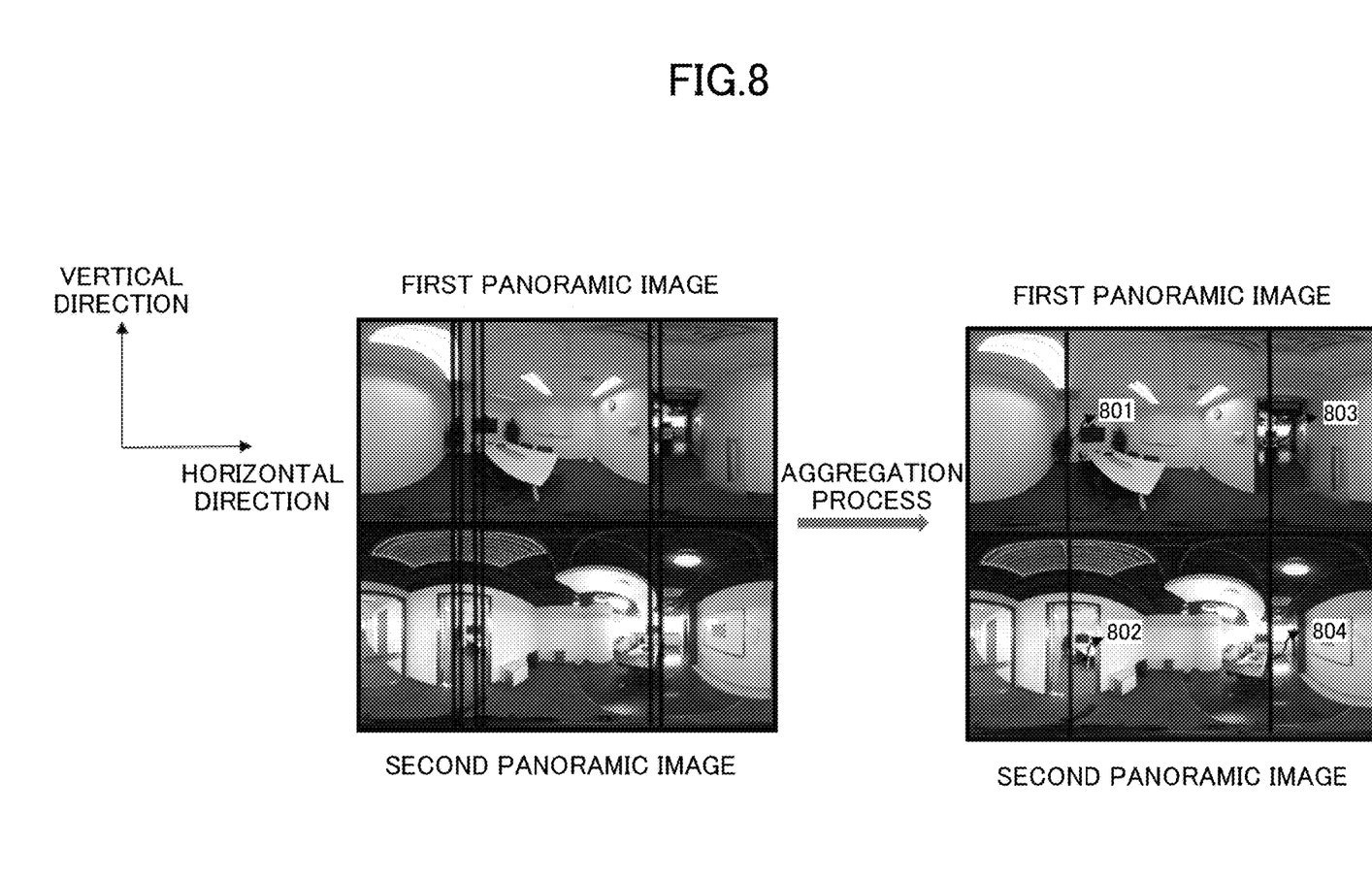
FIG. 8 shows an example of carrying out, in a case where three or more pairs of first image columns are selected, an aggregation process with respect to these pairs of first image columns.

FIG. 8 presents an example of conducting an aggregation process when three or more pairs of first image columns are selected whose feature similarities satisfy the predetermined requirement.

As shown in FIG. 8, several pairs of first image columns are selected from the first and second panoramic image on the left side. By carrying out the aggregation process with respect to these pairs of first image columns, a pair of first image columns 801 and 802 as well as another pair of first image columns 803 and 804 are obtained, as illustrated in the first and second panoramic images on the right side of this drawing. Here it is possible to adopt various approaches to achieve the aggregation process. For example, a clustering process can be performed on the horizontal positions of the selected several pairs of first image columns, so as to find two cluster centers, and let the pairs of image columns at the two cluster centers be the aggregated two pairs of first image columns. Here it should be mentioned that because the clustering process is well used by a person skilled in the art, its detailed description is omitted for the sake of convenience.

Furthermore, it is also possible to directly choose two pairs of first image columns from among the selected several pairs of the first image columns. In this case, as long as the chosen two pairs of first image columns are located at the left and right half parts of the first and second panoramic images, respectively, it is okay. However, the present disclosure is not limited to this.

Figure 9:
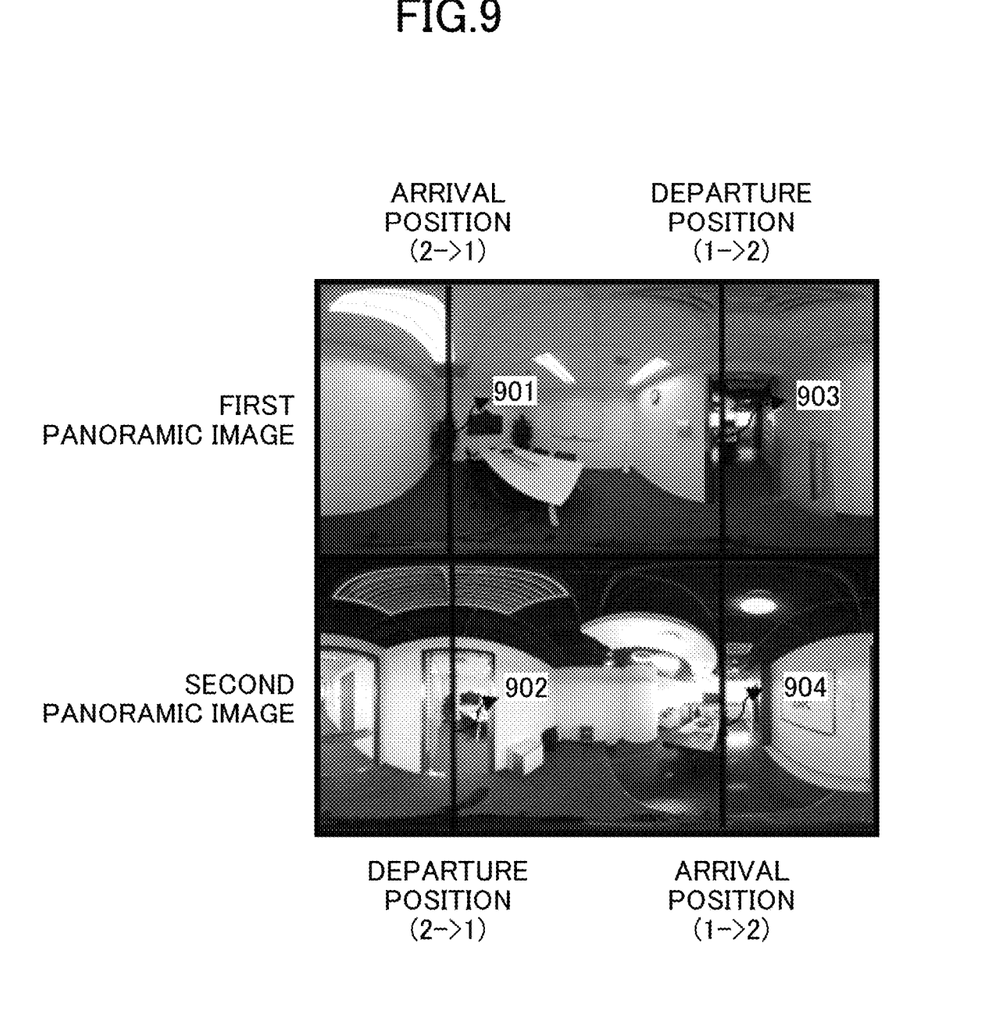
FIG. 9 illustrates an example of determining, based on two pairs of first image columns, departure positions and arrival positions on the first and second panoramic images for jumping between the two.

FIG. 9 shows an example of determining, based on two pairs of first image columns, departure positions and arrival position on the first and second panoramic images for jumping between the two.

As presented in FIG. 9, after STEP S103 of FIG. 1 is executed, two pairs of first image columns on the first and second panoramic images for jumping between the two are finally selected, namely, a pair of first image columns 901 and 902 located at the left half parts of the first and second panoramic images as well as another pair of first image columns 903 and 904 located at the right half parts of the first and second panoramic images. It is possible to determine the position of the first image columns 901 on the first panoramic image as the arrival position for jumping form the second panoramic image to the first panoramic image, the position of the first image column 902 on the second panoramic image as the departure position for jumping from the second panoramic image to the first panoramic image, the position of the first image column 903 on the first panoramic image as the departure position for jumping form the first panoramic image to the second panoramic image, and the position of the first image column 904 on the second panoramic image as the arrival position for jumping from the first panoramic image to the second panoramic image. Moreover, it is also possible to further set a navigation point at any position on each of the first image columns 901 to 904, which is used to be displayed for a user and selected by the user in a virtual roaming process.

On the basis of the panoramic image based jump position determination method, it is possible to automatically and accurately determine jump locations on two panoramic images to reasonably set navigation points, improve the efficiency of setting the navigation points, and keep the viewing angle of a user unchanged before and after jump, so that the user seems jump to a next scene by moving forward, and can have a better progressive roaming experience.

Figure 10:
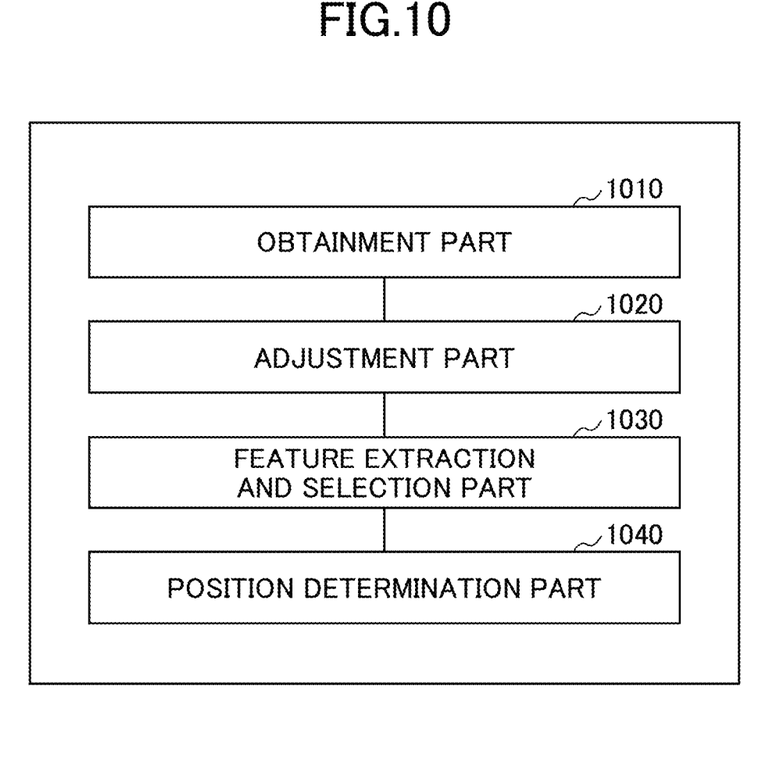
FIG. 10 is a block diagram of a panoramic image based jump position determination apparatus in accordance with an embodiment of the present disclosure.

In what follows, a panoramic image based jump position determination apparatus according to an embodiment of the present disclosure is described by referring to FIG. 10.

FIG. 10 is a block diagram of a panoramic image based jump position determination apparatus 1000 in accordance with this embodiment.

As presented in FIG. 10, the panoramic image based jump position determination apparatus 1000 is inclusive of an obtainment part 1010, an adjustment part 1020, a feature extraction and selection part 1030, and a position determination part 1040. Of course, the panoramic image based jump position determination apparatus 1000 may also include other parts as needed.

The panoramic image based jump position determination apparatus 1000 may be configured to perform the panoramic image based jump position determination method according to the above embodiment. Particularly, the obtainment part 1010, the adjustment part 1020, the feature extraction and selection part 1030, and the position determination part 1040 can be configured to conduct STEPS S101 to S104 of FIG. 1, respectively.

Also, it should be pointed out that for the reason that STEPS S101 to S104 of FIG. 1 have been minutely described in the above embodiment, the details of them are omitted in this embodiment.

On the basis of the panoramic image based jump position determination apparatus 1000, it is possible to automatically and accurately determine jump locations on two panoramic images to reasonably set navigation points, improve the efficiency of setting the navigation points, and keep the viewing angle of a user unchanged before and after jump, so that the user seems jump to a next scene by moving forward, and can have a better progressive roaming experience.

In the following, another panoramic image based jump position determination apparatus according to an embodiment of the present disclosure is described with reference to FIG. 11.

Figure 11:
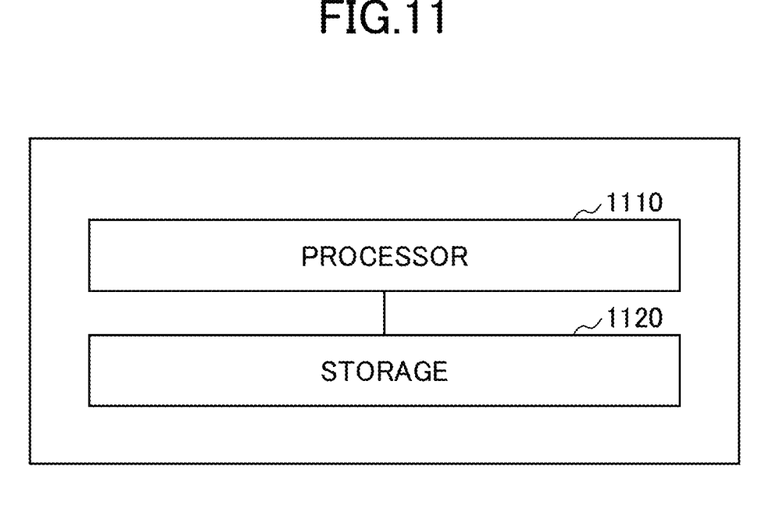
FIG. 11 presents a block diagram of another panoramic image based jump position determination apparatus according to an embodiment of the present disclosure.

FIG. 11 is a block diagram of a panoramic image based jump position determination apparatus 1100 according to this embodiment.

As presented in FIG. 11, the panoramic image based jump position determination apparatus 1100 may contain a processor 1110 and a storage 1120 connected to the processor 1110. Of course, the panoramic image based jump position determination apparatus 1100 may also include other parts as needed.

The processor 1110 may be used to execute a computer program (i.e., computer-executable instructions) stored in the storage 1120 to fulfill the panoramic image based jump position determination method in accordance with the above embodiment. The processor 1110 may adopt any one of the conventional processors in the related art.

The storage 1120 may be utilized to store the computer program and the relating data as well as the intermediate results generated when the processor 1110 conducts the computer program, for example. The storage 1120 may also use any one of the existing storages in the related art.

Moreover, a computer-executable program and a non-transitory computer-readable medium are further provided here. The computer-executable program may cause a computer to perform the panoramic image based jump position determination method according to the above embodiment. The non-transitory computer-readable medium may store computer-executable instructions (i.e., the computer-executable program) for execution by a computer involving a processor. The computer-executable instructions may, when executed by the processor, render the processor to conduct the panoramic image based jump position determination method in accordance with the above embodiment.

Here it should be noted that because the steps involved in the panoramic image based jump position determination method have been concretely described in the above embodiment, the details of the steps are omitted here for the sake of convenience.

In addition, the above embodiments are just exemplary ones, and the specific structure and operation of them may not be used for limiting the present disclosure.

Furthermore, the embodiments of the present disclosure may be implemented in any convenient form, for example, using dedicated hardware or a mixture of dedicated hardware and software. The embodiments of the present disclosure may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, a personal digital assistant, a mobile telephone (such as a WAP or 3G, 4G, or 5G-compliant phone) and so on. Since the embodiments of the present disclosure may be implemented as software, each and every aspect of the present disclosure thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 202011307259.2 filed on Nov. 20, 2020, the entire contents of which are hereby incorporated by reference.

What is claimed is:

1. A panoramic image based jump position determination method comprising:
obtaining a first original panoramic image and a second original panoramic image having a same horizontal width, wherein, a shooting point for shooting the first original panoramic image is located in a three-dimensional (3D) space corresponding to the second panoramic image, and a shooting point for shooting the second panoramic image is located in the 3D space corresponding to the first panoramic image;
performing, based on posture data of cameras respectively shooting the first original panoramic image and the second original panoramic image, an adjustment process on at least one of the first original panoramic image and the second original panoramic image, so as to acquire a first panoramic image and a second panoramic image corresponding to the same camera posture;
after the adjustment process, conducting a feature extraction process with respect to the first panoramic image and the second panoramic image, and choosing, based on a result of the feature extraction process, a plurality of pairs of image columns on the first panoramic image and the second panoramic image, so as to select at least one pair of first image columns from among the plurality of pairs of image columns, wherein, each of the plurality of pairs of image columns has a same horizontal position, and a feature similarity of the at least one pair of first image columns meets a predetermined requirement; and
determining, based on the at least one pair of first image columns, jump positions on the first panoramic image and the second panoramic image for jumping between the first panoramic image and the second panoramic image.

2. The panoramic image based jump position determination method in accordance with claim 1, wherein, the conducting a feature extraction process with respect to the first panoramic image and the second panoramic image includes carrying out feature point matching in regard to the first panoramic image and the second panoramic image, so as to extract a plurality of matched pairs of feature points on the first panoramic image and the second panoramic image.

3. The panoramic image based jump position determination method in accordance with claim 2, wherein, the plurality of matched pairs of feature points serve as the result of the feature extraction process, and the choosing, based on a result of the feature extraction process, a plurality of pairs of image columns on the first panoramic image and the second panoramic image, so as to select at least one pair of first image columns from among the plurality of pairs of image columns includes calculating a position difference between the horizontal positions of each of the plurality of matched pairs of feature points, and choosing at least one pair of first feature points from among the plurality of matched pairs of feature points, so as to select the at least one pair of first image column corresponding to the horizontal position of the at least one pair of first feature points, wherein, the position difference between the horizontal positions of the at least one pair of first feature points is less than a predetermined first threshold.

4. The panoramic image based jump position determination method in accordance with claim 1, wherein, the conducting a feature extraction process with respect to the first panoramic image and the second panoramic image includes inputting the first panoramic image and the second panoramic image into a convolutional neural network, so as to attain at least one first feature map of the first panoramic image and at least one second feature map of the second panoramic image, wherein, the at least one first feature map and the at least one second feature map have the same horizontal width.

5. The panoramic image based jump position determination method in accordance with claim 4, wherein, the at least one first feature map and the at least one second feature map serve as the result of the feature extraction result, and the choosing, based on a result of the feature extraction process, a plurality of pairs of image columns on the first panoramic image and the second panoramic image, so as to select at least one pair of first image columns from among the plurality of pairs of image columns includes calculating a feature difference between each of a plurality of pairs of image column features on the at least one first feature map and the at least one second feature map, and choosing at least one pair of first image column features from among the plurality of pairs of image column features, so as to select at least one pair of first image columns corresponding to a horizontal position of the at least one pair of first image column features, where, each of the plurality of pairs of image column features has the same horizontal position, and the feature difference between the at least one pair of first image column features is less than a predetermined second threshold.

6. The panoramic image based jump position determination method in accordance with claim 3, further comprising:

in a case where the position difference between the horizontal positions of each of the plurality of matched pairs of feature points is greater than or equal to the predetermined first threshold, decreasing the predetermined first threshold until the at least one pair of first feature points is chosen from among the plurality of matched pairs of feature points.

7. The panoramic image based, ump position determination method in accordance with claim 5, further comprising:

in a case where the feature difference between each of the plurality of pairs of image column features is greater than or equal to the predetermined second threshold, decreasing the predetermined second threshold until the at least one pair of first image column features is chosen from among the plurality of pairs of image column features.

8. The panoramic image based jump position determination method in accordance with claim 3, further comprising:

in a case where one pair of first image columns whose feature similarity meets the predetermined requirement is selected, determining another pair of first image columns, wherein, a distance between the horizontal position of the pair of first image columns and a horizontal position of the other pair of first image columns is a half of the same horizontal width.

9. The panoramic image based jump position determination method in accordance with claim 5, further comprising:

in a case where one pair of first image columns whose feature similarity meets the predetermined requirement is selected, determining another pair of first image columns, wherein, a distance between the horizontal position of the pair of first image columns and a horizontal position of the other pair of first image columns is a half of the same horizontal width.

10. The panoramic image based jump position determination method in accordance with claim 3, further comprising:

in a case where three or more pairs of first image columns whose feature similarities meet the predetermined requirement are selected, carrying out an aggregation process with respect to the three or more pairs of first image columns, so as to acquire two pairs of first image columns.

11. The panoramic image based jump position determination method in accordance with claim 5, further comprising:

in a case where three or more pairs of first image columns whose feature similarities meet the predetermined requirement are selected, carrying out an aggregation process with respect to the three or more pairs of first image columns, so as to acquire two pairs of first image columns.

12. A non-transitory computer-readable medium having computer-executable instructions for execution by a processor, wherein, the computer-executable instructions, when executed by the processor, cause the processor to conduct the panoramic image based jump position determination method in accordance with claim 1.

13. A panoramic image based jump position determination apparatus comprising:

a processor;

a memory storing computer-executable instructions, connected to the processor, the processor executing the computer-executable instructions to:

obtain a first original panoramic image and a second original panoramic image having a same horizontal width, wherein, a shooting point for shooting the first original panoramic image is located in a three-dimensional (3D) space corresponding to the second panoramic image, and a shooting point for shooting the second panoramic image is located in the 3D space corresponding to the first panoramic image;

perform, based on posture data of cameras respectively shooting the first original panoramic image and the second original panoramic image, an adjustment process on at least one of the first original panoramic image and the second original panoramic image, so as to acquire a first panoramic image and a second panoramic image corresponding to the same camera posture;

after the adjustment process, conduct a feature extraction process with respect to the first panoramic image and the second panoramic image, and choose, based on a result of the feature extraction process, a plurality of pairs of image columns on the first panoramic image and the second panoramic image, so as to select at least one pair of first image columns from among the plurality of pairs of image columns, wherein, each of the plurality of pairs of image columns has a same horizontal position, and a feature similarity of the at least one pair of first image columns meets a predetermined requirement; and determine, based on the at least one pair of first image columns, jump positions on the first panoramic image and the second panoramic image for jumping between the first panoramic image and the second panoramic image.

14. The panoramic image based jump position determination apparatus in accordance with claim 13, wherein, the conducting a feature extraction process with respect to the first panoramic image and the second panoramic image includes carrying out feature point matching in regard to the first panoramic image and the second panoramic image, so as to extract a plurality of matched pairs of feature points on the first panoramic image and the second panoramic image.

15. The panoramic image based jump position determination apparatus in accordance with claim 14, wherein, the plurality of matched pairs of feature points serve as the result of the feature extraction process, and the choosing, based on a result of the feature extraction process, a plurality of pairs of image columns on the first panoramic image and the second panoramic image, so as to select at least one pair of first image columns from among the plurality of pairs of image columns includes calculating a position difference between the horizontal positions of each of the plurality of matched pairs of feature points, and choosing at least one pair of first feature points from among the plurality of matched pairs of feature points, so as to select the at least one pair of first image column corresponding to the horizontal position of the at least one pair of first feature points, wherein, the position difference between the horizontal positions of the at least one pair of first feature points is less than a predetermined first threshold.

16. The panoramic image based jump position determination apparatus in accordance with claim 13, wherein, the conducting a feature extraction process with respect to the first panoramic image and the second panoramic image includes inputting the first panoramic image and the second panoramic image into a convolutional neural network, so as to attain at least one first feature map of the first panoramic image and at least one second feature map of the second panoramic image, wherein, the at least one first feature map and the at least one second feature map have the same horizontal width.

17. The panoramic image based jump position determination apparatus in accordance with claim 16, wherein, the at least one first feature map and the at least one second feature map serve as the result of the feature extraction result, and the choosing, based on a result of the feature extraction process, a plurality of pairs of image columns on the first panoramic image and the second panoramic image, so as to select at least one pair of first image columns from among the plurality of pairs of image columns includes calculating a feature difference between each of a plurality of pairs of image column features on the at least one first feature map and the at least one second feature map, and choosing at least one pair of first image column features from among the plurality of pairs of image column features, so as to select at least one pair of first image columns corresponding to a horizontal position of the at least one pair of first image column features, where, each of the plurality of pairs of image column features has the same horizontal position, and the feature difference between the at least one pair of first image column features is less than a predeteiiiiined second threshold.

18. The panoramic image based jump position determination apparatus in accordance with claim 15, further comprising:

in a case where the position difference between the horizontal positions of each of the plurality of matched pairs of feature points is greater than or equal to the predetermined first threshold, decreasing the predetermined first threshold until the at least one pair of first feature points is chosen from among the plurality of matched pairs of feature points.

19. The panoramic image based jump position determination apparatus in accordance with claim 17, further comprising:

in a case where the feature difference between each of the plurality of pairs of image column features is greater than or equal to the predetermined second threshold, decreasing the predetermined second threshold until the at least one pair of first image column features is chosen from among the plurality of pairs of image column features.

* * * * *